(12) United States Patent
Janulewicz et al.

(10) Patent No.: US 12,019,712 B2
(45) Date of Patent: Jun. 25, 2024

(54) ENHANCED REINFORCEMENT LEARNING ALGORITHMS USING FUTURE STATE PREDICTION SCALED REWARD VALUES

(71) Applicant: Ciena Corporation, Hanover, MD (US)

(72) Inventors: Emil Janulewicz, Ottawa (CA); Sergio Slobodrian, Richmond (CA)

(73) Assignee: Ciena Corporation, Hanover, MD (US)

( * ) Notice: Subject to any disclaimer, the term of this patent is extended or adjusted under 35 U.S.C. 154(b) by 210 days.

(21) Appl. No.: 17/540,503

(22) Filed: Dec. 2, 2021

(65) Prior Publication Data

US 2023/0177117 A1 Jun. 8, 2023

(51) Int. Cl.
  G06F 18/21 (2023.01)
  G06F 18/214 (2023.01)

(52) U.S. Cl.
  CPC ...... *G06F 18/2185* (2023.01); *G06F 18/2148* (2023.01)

(58) Field of Classification Search
  None
  See application file for complete search history.

(56) References Cited

U.S. PATENT DOCUMENTS

| | | | |
|---|---|---|---|
| 9,686,176 B2 | 6/2017 | Traxler et al. | |
| 10,171,161 B1 | 1/2019 | Côté et al. | |
| 10,187,318 B2 | 1/2019 | Cote et al. | |
| 10,965,527 B2 | 3/2021 | Triplet et al. | |
| 11,126,929 B2 * | 9/2021 | Janulewicz | G06N 3/006 |
| 11,153,229 B2 | 10/2021 | Djukic et al. | |
| 2018/0248905 A1 | 8/2018 | Côté et al. | |
| 2018/0322637 A1 * | 11/2018 | Ghesu | G06N 7/01 |
| 2019/0138948 A1 * | 5/2019 | Janulewicz | G06N 7/01 |
| 2019/0280942 A1 | 9/2019 | Côté et al. | |

(Continued)

OTHER PUBLICATIONS

Gari, Yisel, et al. "Reinforcement learning-based application autoscaling in the cloud: A survey." Engineering Applications of Artificial Intelligence 102 (Jun. 2021): 104288. Available online: https://www.sciencedirect.com/science/article/pii/S0952197621001354 (Year: 2021).*

*Primary Examiner* — Tahmina N Ansari
(74) *Attorney, Agent, or Firm* — Clements Bernard Walker; Christopher L. Bernard

(57) ABSTRACT

In various embodiments, the present disclosure relates to systems and methods for enhanced reinforcement learning (RL) algorithms using future state prediction. In some embodiments, an offline emulator can be applied allowing the generation of samples, thus supporting continuous training of the system and fast-forward fabric saturation. The fabric accepts transactions which allocate resources with respect to the transactions needs and constraints and contains an RL/AI model(s) which are continuously learning based on the current reward combined with reward scaling. By modelling the fabric and transactions in an emulator, it is possible to predict future states and calculate adjusted rewards with respect to the optimal criterion. A state generator is based on modeling past historical transactions, allowing a user to anticipate future state characteristics of the fabric. In some embodiments, online learning is based on adjusted rewards which are more representative with respect to the objective function.

19 Claims, 17 Drawing Sheets

(56) References Cited

U.S. PATENT DOCUMENTS

| | | |
|---|---|---|
| 2020/0336376 A1 | 10/2020 | Mahdi et al. |
| 2021/0028973 A1 | 1/2021 | Côté et al. |
| 2021/0099378 A1 | 4/2021 | Alaettinoglu et al. |
| 2023/0177117 A1* | 6/2023 | Janulewicz ......... G06F 18/2185 382/159 |

* cited by examiner

ENHANCED REINFORCEMENT LEARNING ALGORITHMS USING FUTURE STATE PREDICTION SCALED REWARD VALUES

FIELD OF THE DISCLOSURE

The present disclosure generally relates to Reinforcement Learning (RL) systems and methods. More particularly, the present disclosure relates to systems and methods for enhanced Reinforcement Learning algorithms using future state prediction.

BACKGROUND OF THE DISCLOSURE

Reinforcement learning (RL) is an area of machine learning inspired by behaviorist psychology. In general, RL seeks to learn what to do given a problem, i.e., an optimal mapping from its current state to some action, to maximize the received reward signal in the long run. Often, a software agent does not have any prior knowledge of its operating environment and must discover which actions yield the most reward by trying them out. This leads to the trade-off between exploration and exploitation. The agent must exploit what it already knows to obtain rewards, but also needs to explore to make better actions in the future.

Typical enhancements to RL algorithms seek to improve the decision-making capabilities of an agent in a given state. Although, known techniques result in optimal solutions which do not scale and are far too complex for real world systems. In reality, these optimal solutions are infeasible other than for small example models. Since the future state is not considered, the system will often choose a sub-optimal solution because the system does not progress with evolving transaction patterns.

BRIEF SUMMARY OF THE DISCLOSURE

In various embodiments, the present disclosure includes enhanced reinforcement learning (RL) algorithms using future state prediction to improve the operation of systems and finding optimal solutions. The present disclosure utilizes an offline emulator to generate samples, thus supporting continuous training and fast-forward fabric saturation. A request generator is based on modeling past historical transactions, allowing a user to anticipate future state characteristics of the fabric. Fast-forward reward computation leverages the offline emulator, thus allowing for quicker feedback for decision points and model training.

In an embodiment, a non-transitory computer-readable medium including instructions that, when executed, cause a processor to perform the steps of: receiving historical transactions for a system having resources used therein; receiving a request for a new transaction for the system; determining a reward value in Reinforcement Learning (RL) for a plurality of actions for the new transaction; and utilizing the historical transactions to scale the reward value for each of the plurality of actions. The non-transitory computer-readable medium further includes selecting one of the plurality of actions based on the scaled reward value. The non-transitory computer-readable medium may include a step where the selected action initially has a worse reward value than one or more other actions, but has a best scaled reward value. The non-transitory computer-readable medium may include adding a plurality of historical transactions to fast forward a state of the system in RL and to determine a value and corresponding action in the fast forwarded state. The non-transitory computer-readable medium may include steps where the adding of the plurality of historical transactions to fast forward a state of the system in RL to determine a value and corresponding action in the fast forwarded state takes place in an emulator. The plurality of historical transactions may all include addition of resources to the system. The system can be a network.

In another embodiment, a server includes: a processing device; a memory device configured to store a computer program having instructions that, when executed, cause a processing device to perform the steps of; receiving historical transactions for a system having resources used therein; receiving a request for a new transaction for the system; determining a reward value in Reinforcement Learning (RL) for a plurality of actions for the new transaction; and utilizing the historical transactions to scale the reward value for each of the plurality of actions. The steps may include selecting one of the plurality of actions based on the scaled reward value. The selected action may initially have a worse reward value than one or more other actions, but has a best scaled reward value. The steps may include adding a plurality of historical transactions to fast forward a state of the system in RL and to determine a value a corresponding action in the fast forwarded state. The adding of the plurality of historical transactions to fast forward a state of the system in RL to determine a value and corresponding action in the fast forwarded state may take place in an emulator. The plurality of historical transactions may all include addition of resources to the system. The system may be a network.

In a further embodiment, a method includes the steps of: receiving historical transactions for a system having resources used therein; receiving a request for a new transaction for the system; determining a reward value in Reinforcement Learning (RL) for a plurality of actions for the new transaction; and utilizing the historical transactions to scale the reward value for each of the plurality of actions. The steps may further include selecting one of the plurality of actions based on the scaled reward value. The selected action may initially have a worse reward value than one or more other actions, but has a best scaled reward value. The utilizing may further include adding a plurality of historical transactions to fast forward a state of the system in RL and to determine a value a corresponding action in the fast forwarded state. The plurality of historical transactions may all include addition of resources to the system. The system may be a network.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
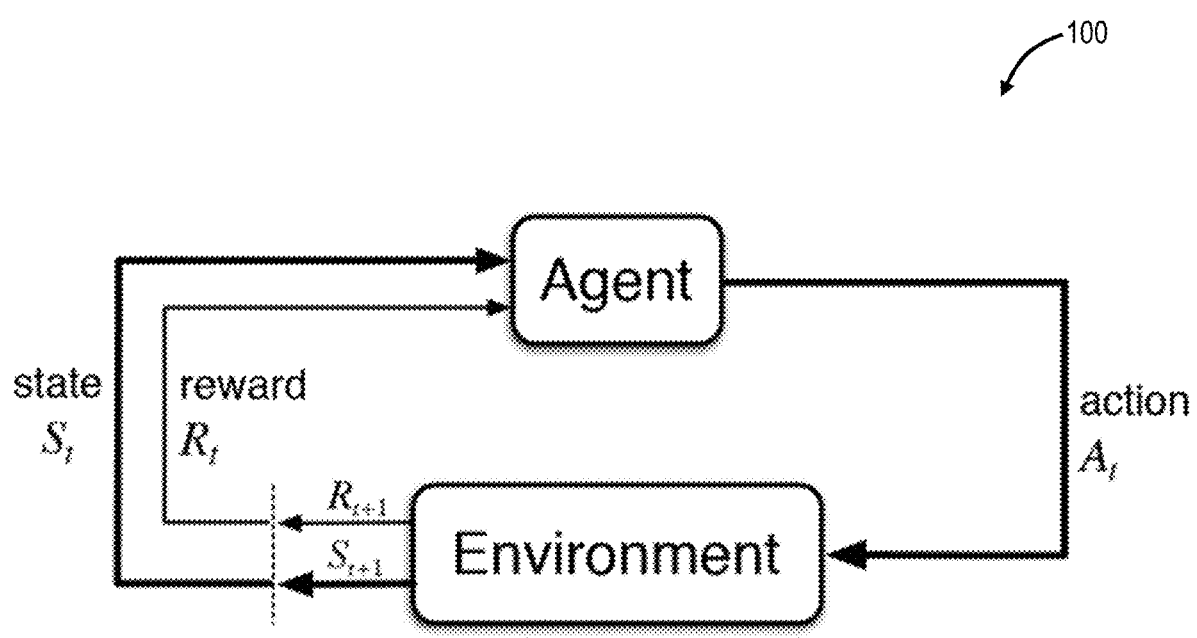
FIG. 1 is a diagram of a conventional RL process.

In various embodiments, the present disclosure relates to systems and methods for enhanced reinforcement learning (RL) algorithms using future state prediction. As stated, typical RL algorithms do not consider the future state of the system and will often choose sub-optimal solutions because evolving transaction patterns are not considered in the process. In some embodiments, an offline emulator can be applied allowing the generation of samples, thus supporting continuous training of the system and fast-forward fabric saturation, the fabric being a resource based system (RBS) containing a multitude of resource types. The fabric accepts transactions which allocate resources with respect to the transactions needs and constraints and contains an RL/AI model(s) which are continuously learning based on the current reward combined with reward scaling. By modelling the fabric and transactions in an emulator, it is possible to predict future states and calculate adjusted rewards with respect to the optimal criterion. The optimal state can be defined as the state of the fabric (and the resources therein) which meets a pre-defined optimality criterion. A state generator is based on modeling past historical transactions, allowing a user to anticipate future state characteristics of the fabric. In some embodiments, online learning is based on adjusted rewards which are more representative with respect to the objective function. By maximizing fabric utilization, resource based systems can have lean operation, reducing operating expenses or expenditure (OPEX).

Reinforcement Learning

In general, RL includes seeking to learn what to do given a problem, i.e., an optimal mapping from its current state to some action, so as to maximize the reward signal in the long run. Often times, an agent does not have any a priori knowledge of its environment and must discover which actions yield the most reward by trying them out. This leads to the trade-off between exploration and exploitation. The agent must exploit what it already knows in order to obtain rewards, but also needs to explore in order to make better actions in the future.

The agent implements reinforcement level algorithms applied to any system such as a networking space. At the high level, as documented in (1) Ian Goodfellow et al, "Deep Learning", available online at www.deeplearningbook.org, and (2) David Silver et al., "Mastering the game of Go without human knowledge," Nature 550.7676 (2017): 354, the contents of each are incorporated herein by reference, these processes require a cost function, a parametrization of the system state (network state), and a list of possible actions.

At each iteration of the RL system, the state of the system s is determined from the telemetry data. This determines a value of the reward r(s) (also referred to as "cost") associated with that state. Then, the RL process determines the action a that can be taken on the system in order to bring it to the next state s', which is expected to get a better or equal reward r(s'). Note that "doing nothing" is a valid action. When doing so, taking Q-learning as an example, the RL process updates the value Q(s, a) as follows:

$$Q(s, a) \to (1 - \alpha)Q(a, s) + \alpha(r + \gamma)\max_{a'} Q(s', a')$$

After several iterations, the map of Q(s, a) becomes an accurate description of the system states and their possible best actions. Parameter a called the learning rate, determines the relative weight of newer states with respect to older ones. This configures how quickly the RL can adapt to changing conditions versus how much it will remember its lessons from the past when getting to choose an action. A valid action a in a given state s is chosen with probability according to the Boltzmann Distribution:

$$\frac{e^{Q(s,a)/T}}{\sum_{a'} e^{Q(s,a')/T}}$$

The choice of hyper-parameter T can be varied depending on how much exploration is desired versus exploiting the greedy action. It is best practice to start with a large T, allowing different actions to be chosen. As T tends to 0, we ensure choosing the best possible action.

FIG. 1 is a diagram 100 of an RL process. At each time step t, the agent needs to select an action $A_t$ provided its current state $S_t$. The choice of action will move the agent to the next state $S_{t+1}$ and more importantly, provide a numerical reward $R_{t+1}$. The goal is to determine a policy, which is a mapping from states to actions, which maximizes the reward it receives in the long run.

Often times the environment and rewards are known, whether it is pre-defined or estimated via sampling (exploration). In the case where the next state is only conditioned on the current state, one can formulate the problem as a finite Markov Decision Process. The dynamics of a finite MDP are defined by its state and actions sets, and the one-step transition probabilities:

$$Pr\{S_{t+1}=s', R_{t+1}=r | S_t=s, A_t=a\}$$

For example, the objective is to maximize (or minimize) the total discounted accumulated reward for each time step—

$$G_t = R_{t+1} + \gamma R_{t+2} + \gamma^2 R_{t+3} + \ldots = \sum_{k=0}^{\infty} \gamma^k R_{t+k+1}$$

At any time step t, the goal is to maximize expected cumulative rewards going forward. Adding a discount factor $0 < \gamma < 1$ guarantees convergence and also provides intuition about the interplay between short and long-term goals.

This can be generalized for each state via a value function given some policy is followed.

$$v_\pi(s) = E_\pi[G_t | S_t = s]$$

The value function is also known as Bellman's equation, which can be solved using Dynamic Programing (DP) techniques (optimal control) such as Value iteration and Policy Iteration. Imagine sitting down an eating a piece of cake; the optimal action would be to take another bite (to receive a good feeling signal) if gamma is small. But if gamma is large, the negative long-term consequences weigh more, and one would stop eating in order to avoid the negative consequences.

Thus, it is desired to find the optimal policy which maximizes the value of each state:

$$v_*(s) = \max_\pi v_\pi(s) \forall s \in S$$

This can be a model-free reinforcement learning technique. The agent has no idea of its environment dynamics and learns at each step. The agent heavily relies on exploration at the beginning in order to visit as many different states as possible and can adapt to changing environments which in turn creates optimal policies. For any finite MDP (Markov Decision Process)—Q-learning eventually finds an optimal policy—

$$Q(s, a) \rightarrow (1 - \alpha)Q(s, a) + \alpha\left(r + \gamma \max_{a'} Q(s', a')\right)$$

FIGS. 2-9 are grids illustrating the optimal policy denoted by arrows for various different values. RL utilizes grids to describe the state and transitions. In the grids described in FIGS. 2-9, the arrows illustrate state transitions from selecting the optimal actions, the values of the X and Y axis can be generic and represent the states, e.g., configurations of the system and the system elements. The shading inside the grid represents the rewards with a higher value (darker shading) indicative of higher rewards.

Figure 2:
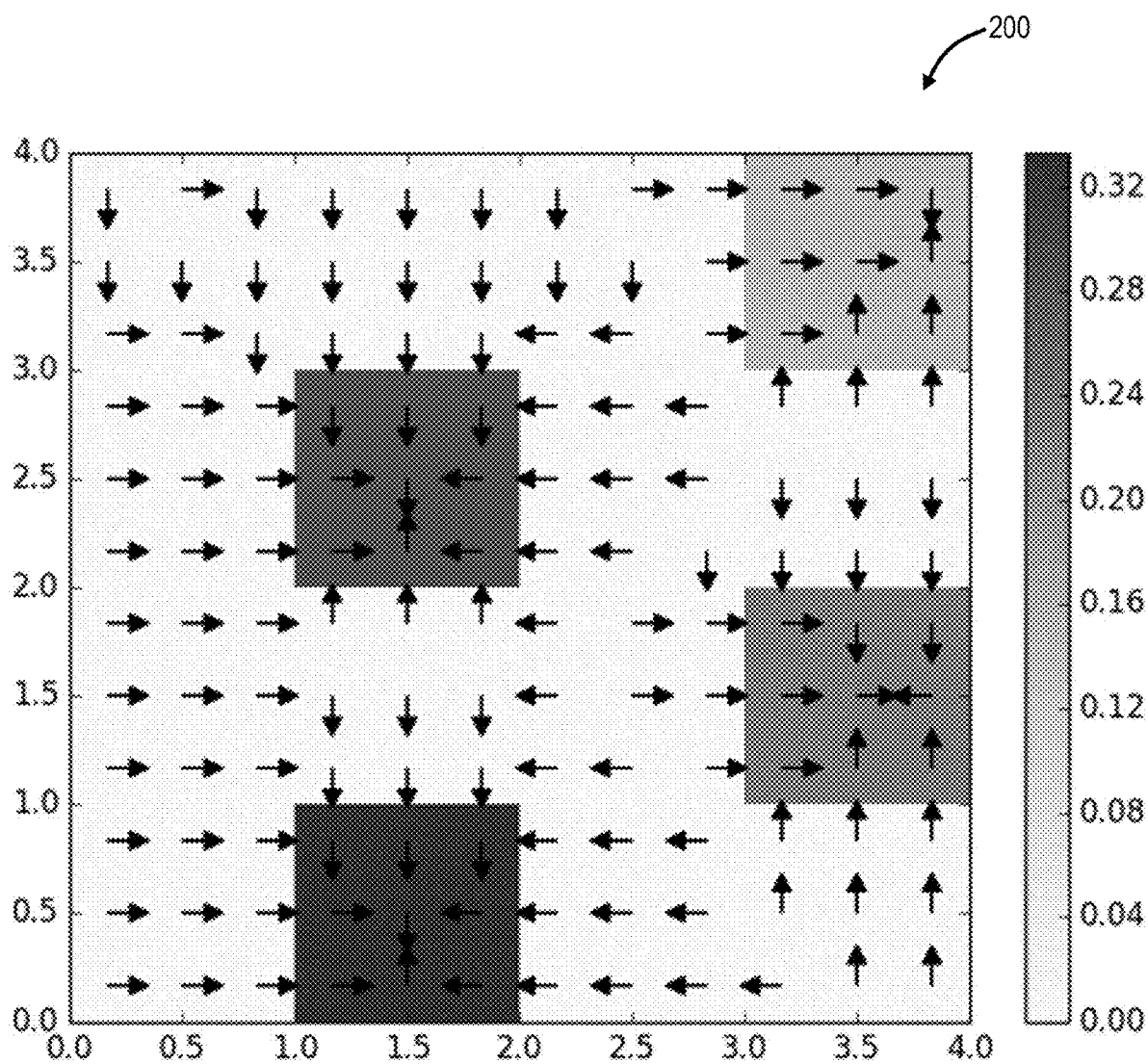
FIG. 2 is a grid illustrating the value function with various different values and $\gamma=0.8$.
Figure 3:
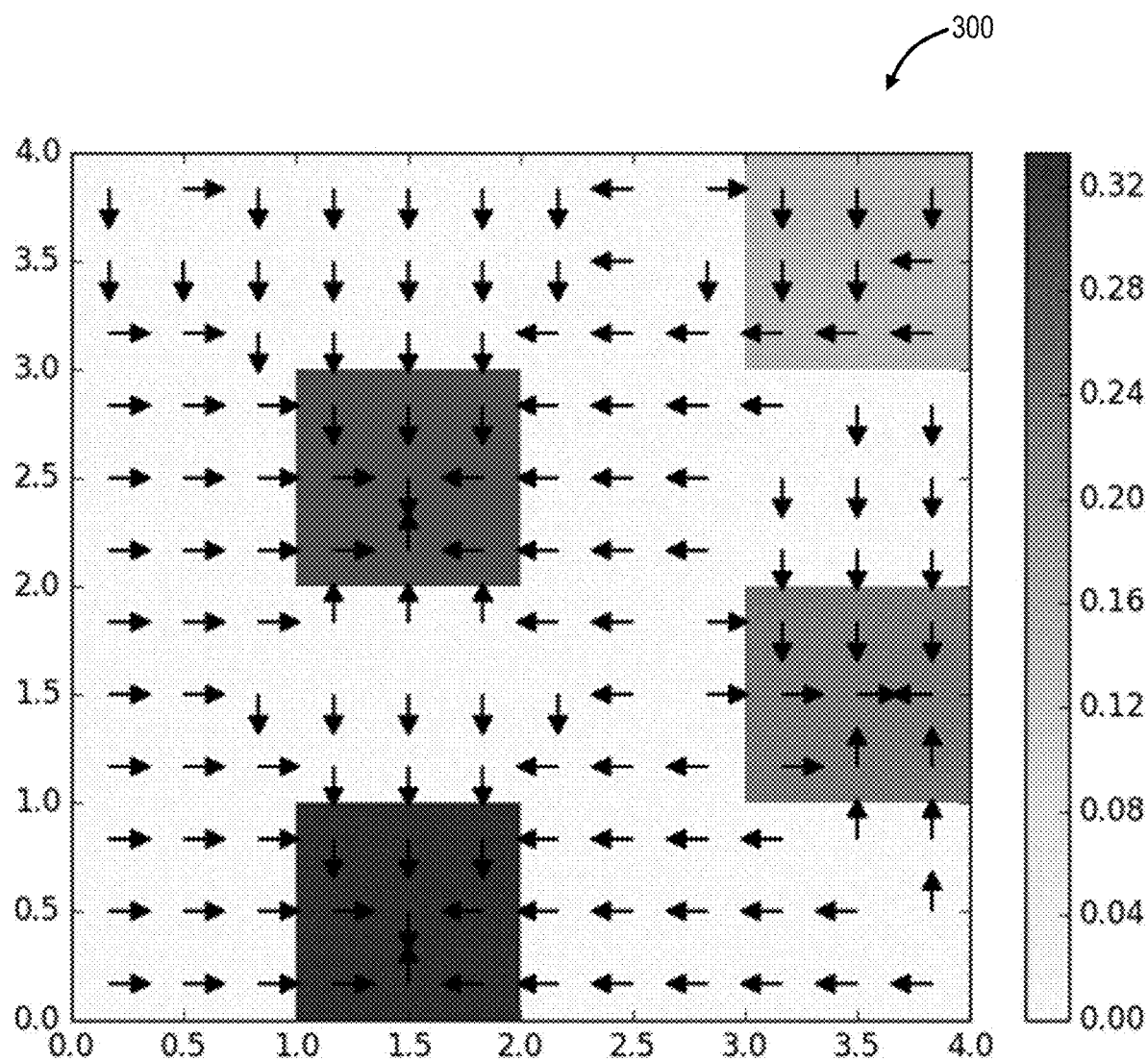
FIG. 3 is a grid illustrating the value function with various different values and $\gamma=0.9$.
Figure 4:
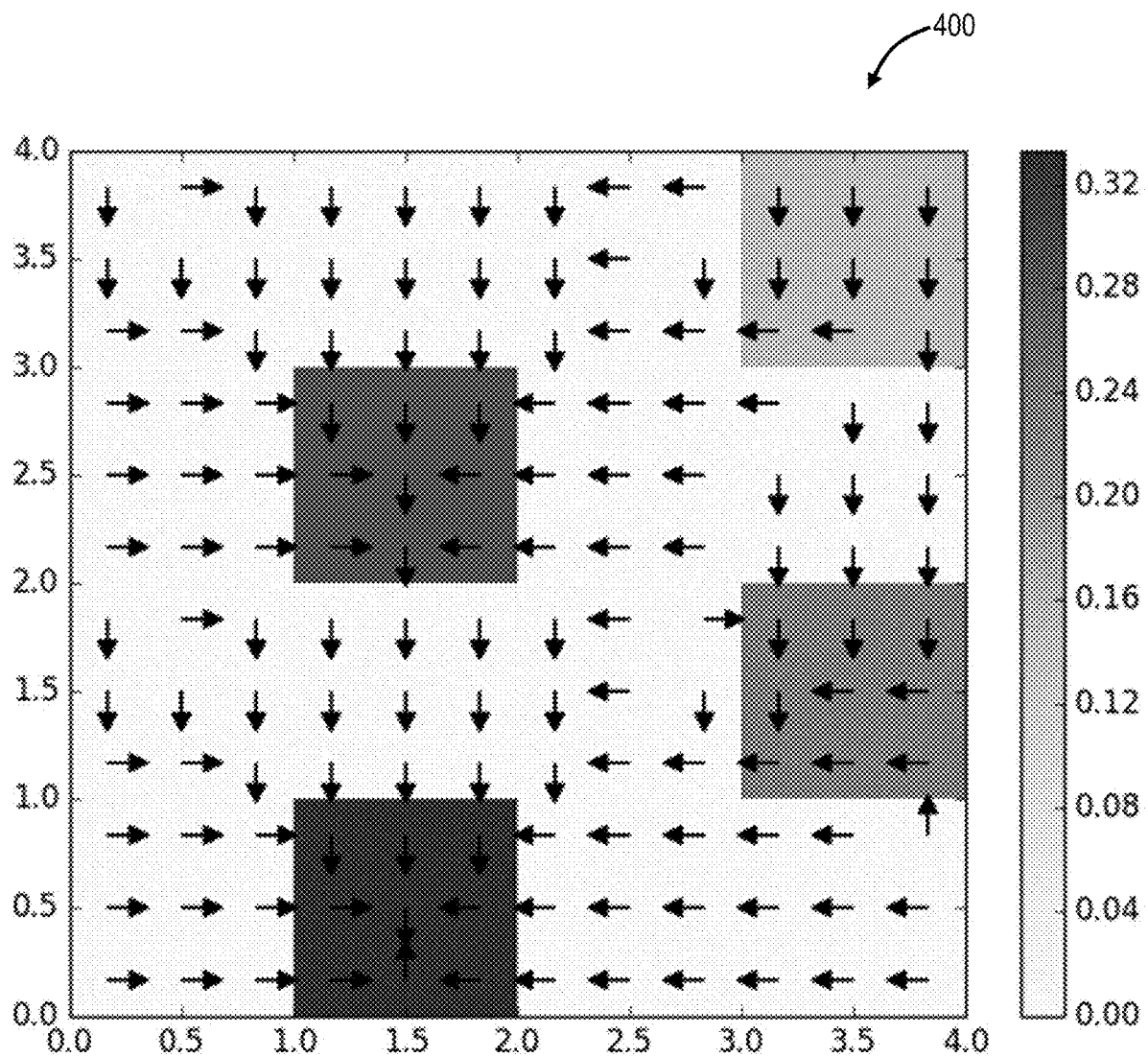
FIG. 4 is a grid illustrating the value function with various different values and $\gamma=0.99$.

FIG. 2 is a grid 200 illustrating $\gamma$=0.8, and the best policy is to go to the nearest reward, and there is no long-term planning. Specifically, at any starting point, the RL process drives to the nearest reward, not necessarily the highest value reward. FIG. 3 is a grid 300 illustrating $\gamma$=0.9 showing a stronger desire to find long-term rewards. FIG. 4 is a grid 400 illustrating $\gamma$=0.99 showing long-term planning wherein the state transitions proceed to the highest reward value.

In accordance with another implementation, Inverse RL (Apprenticeship learning) aims to recover the reward function from observing some expert behavior and associate trajectories. Learning specific behavior given a particular state does not generalize well. The reward function provides the most succinct transferable definition of a task. One can find a reward function R* such that:

$$E\left[\sum_{t=0}^{\infty} \gamma^t R^*(S_t) \middle| \pi^*\right] \geq E\left[\sum_{t=0}^{\infty} \gamma^t R^*(S_t) \middle| \pi\right] \forall \pi$$

Figure 5:
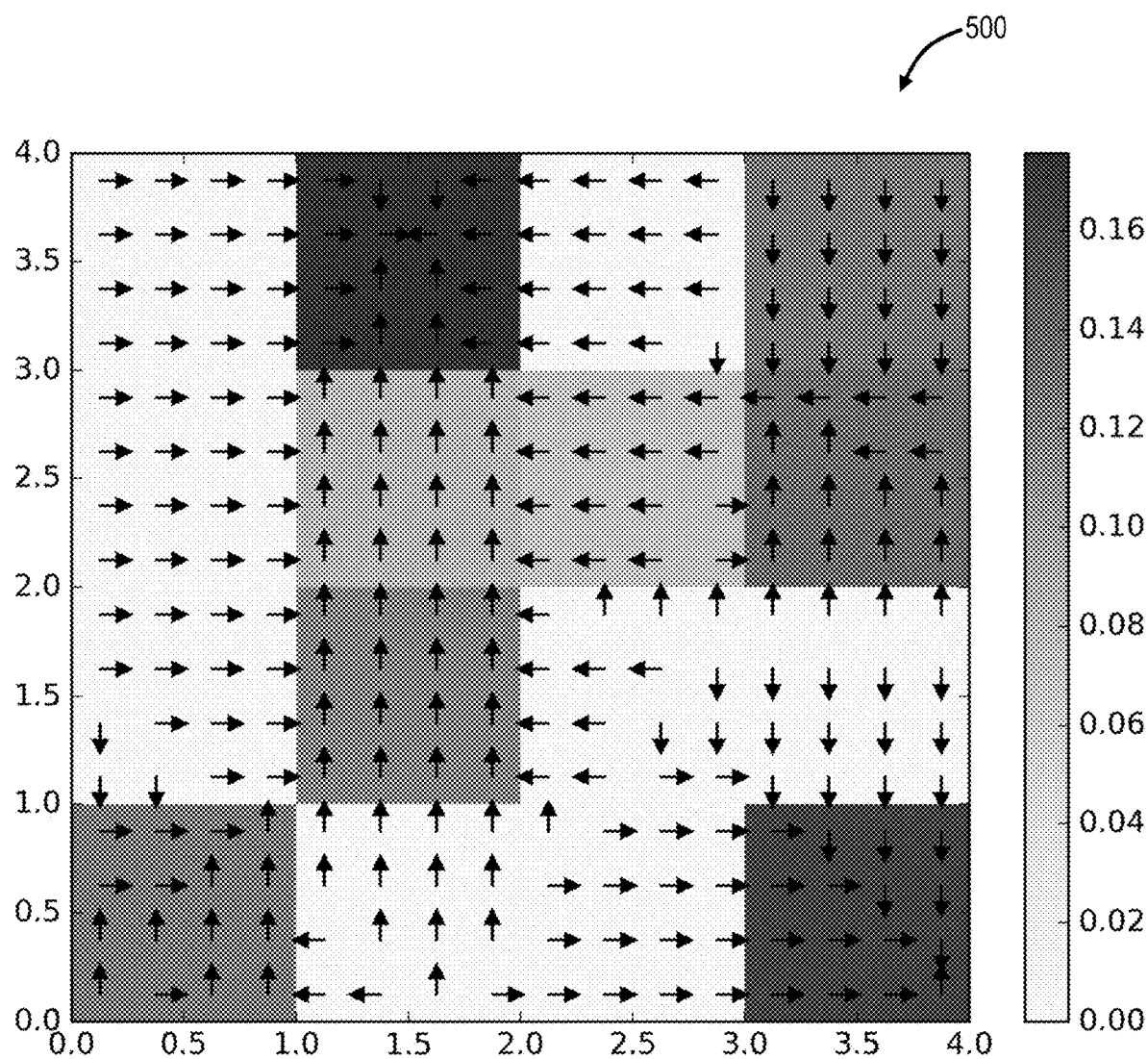
FIG. 5 is a grid illustrating a framework of expert policy.
Figure 6:
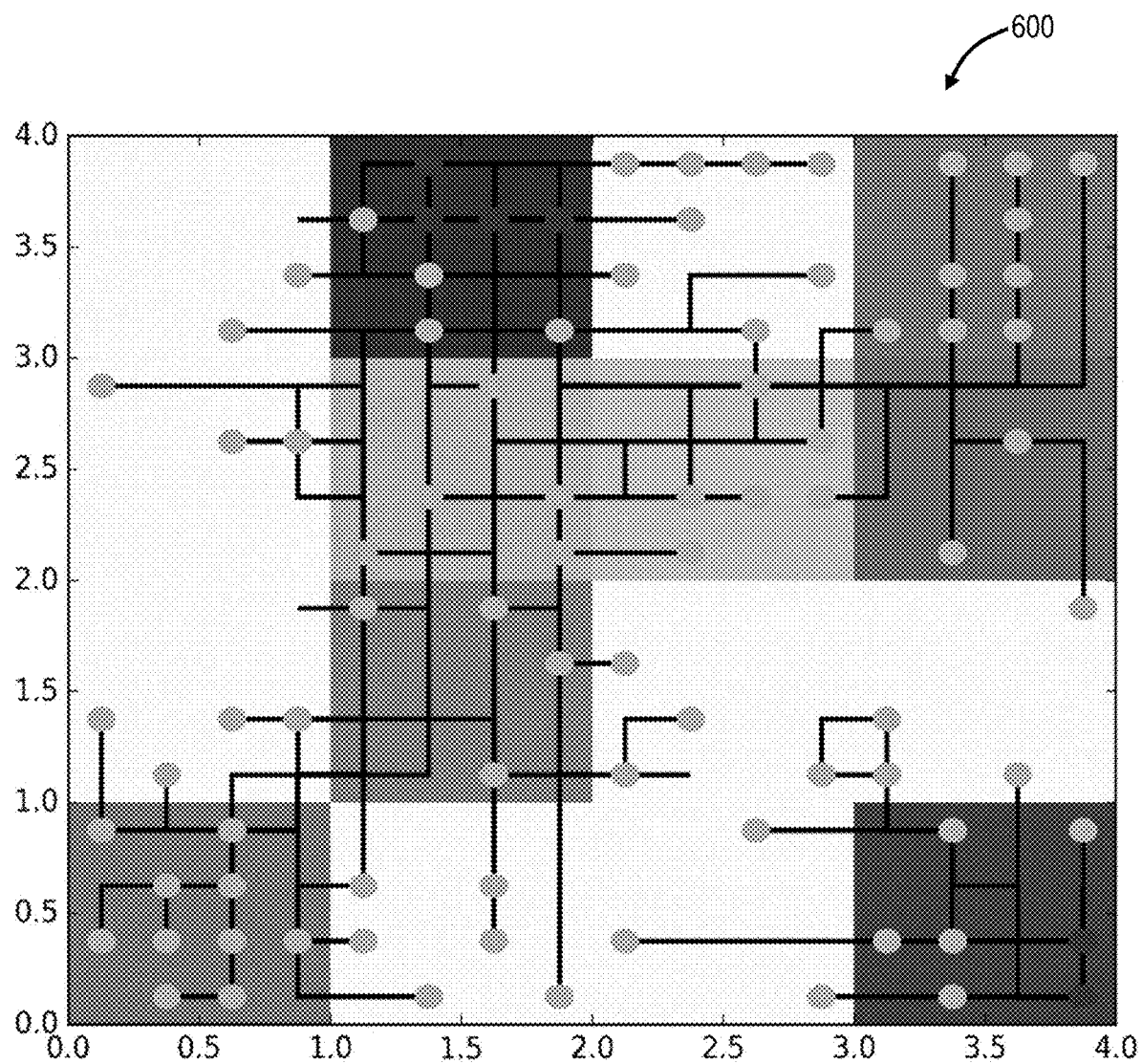
FIG. 6 is a grid illustrating expert trajectories.
Figure 7:
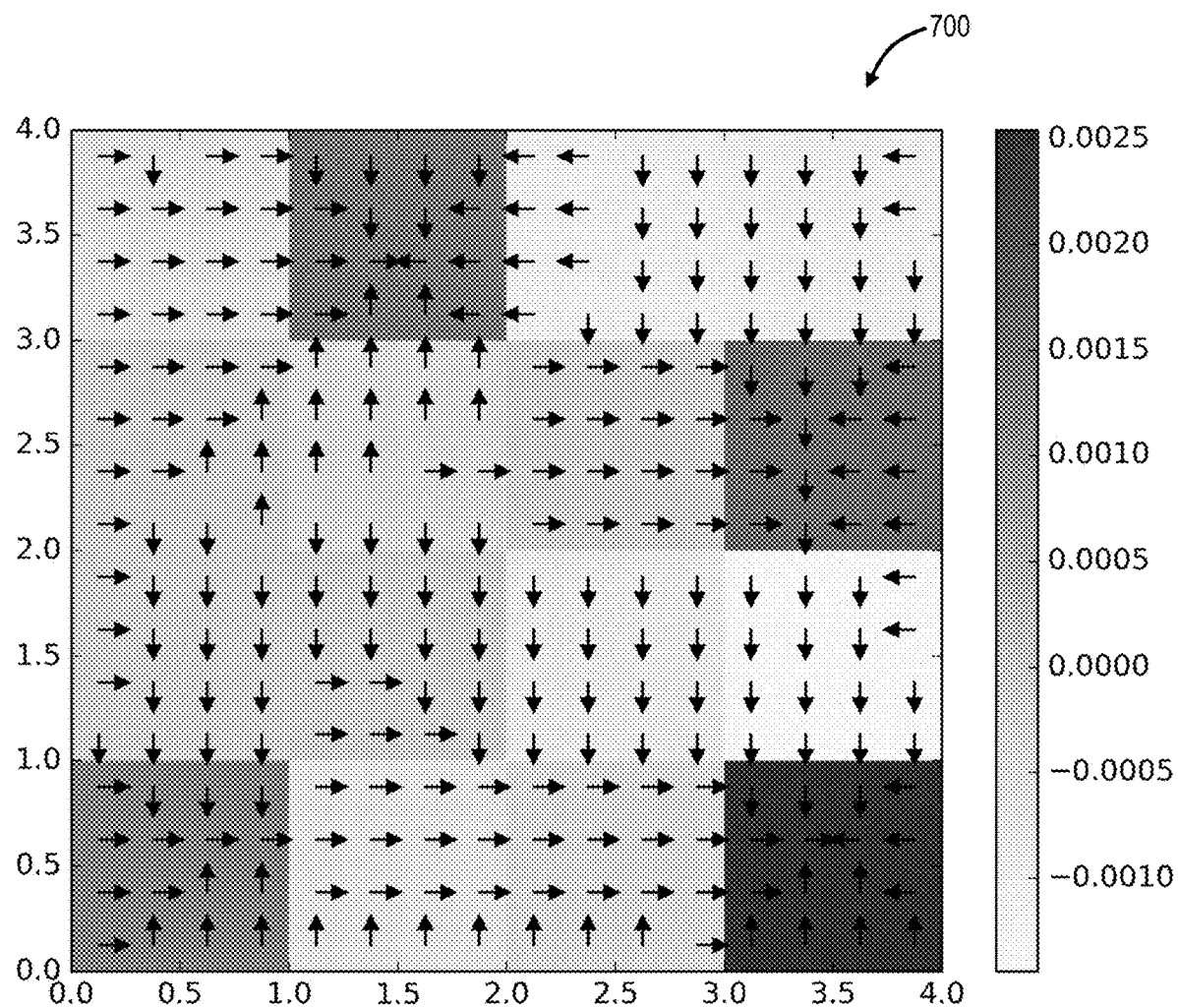
FIG. 7 is a grid illustrating a framework of learner policies.
Figure 8:
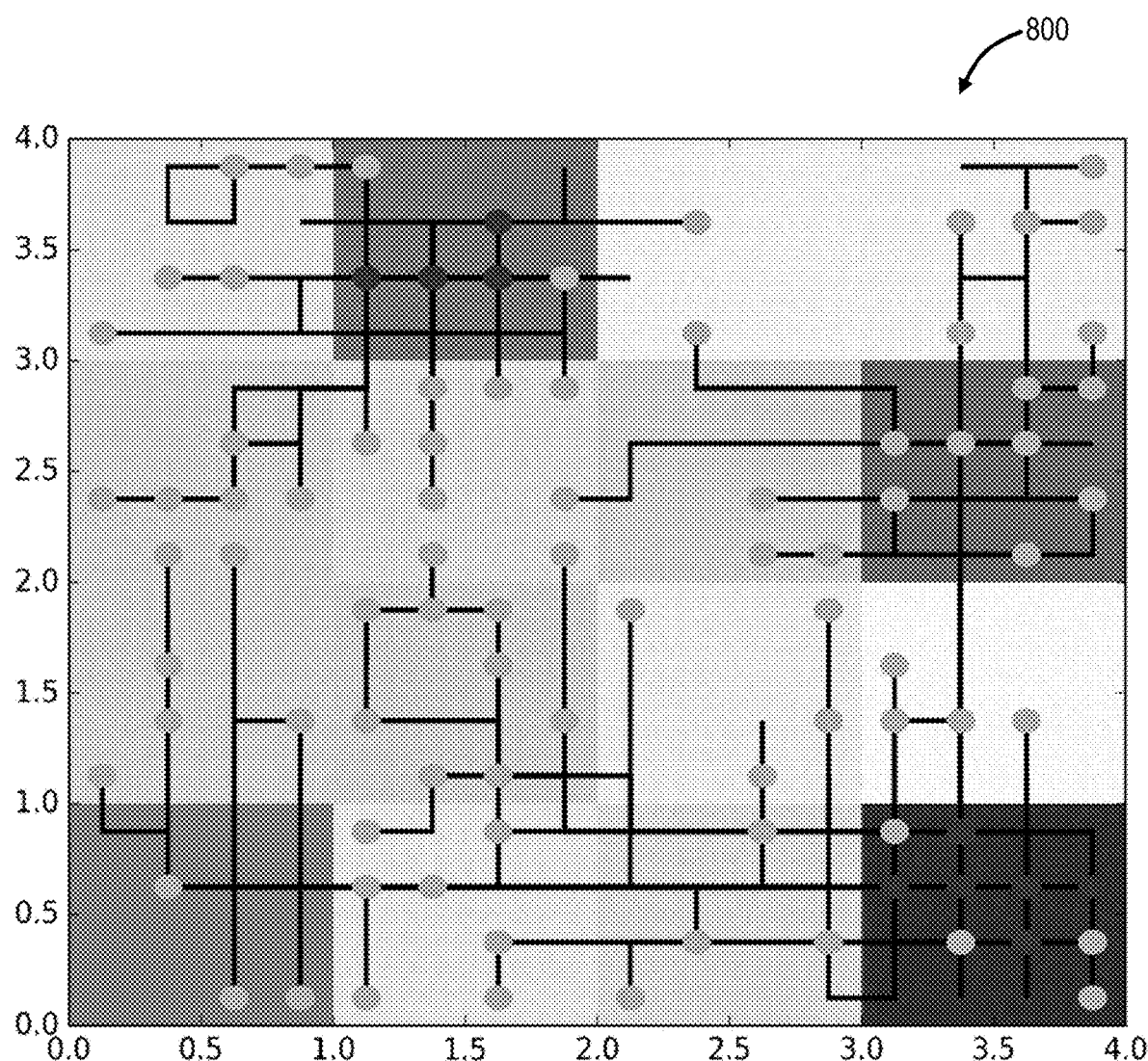
FIG. 8 is a grid illustrating learner trajectories.
Figure 9:
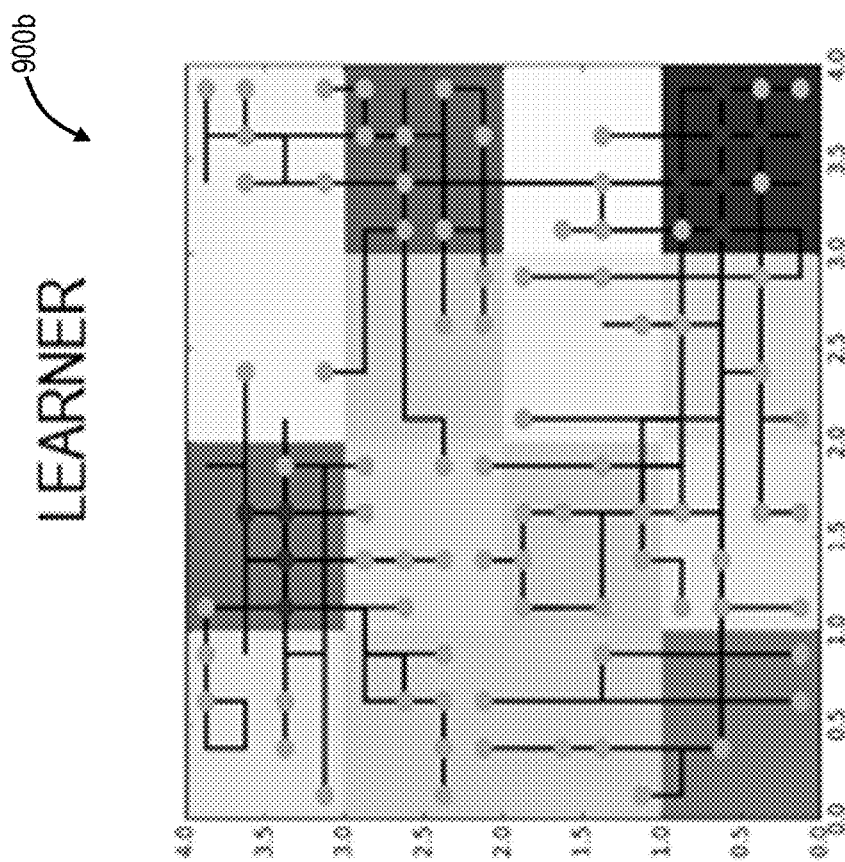
FIG. 9 illustrates a comparison of the expert trajectories and the learner trajectories.
Figure 9:
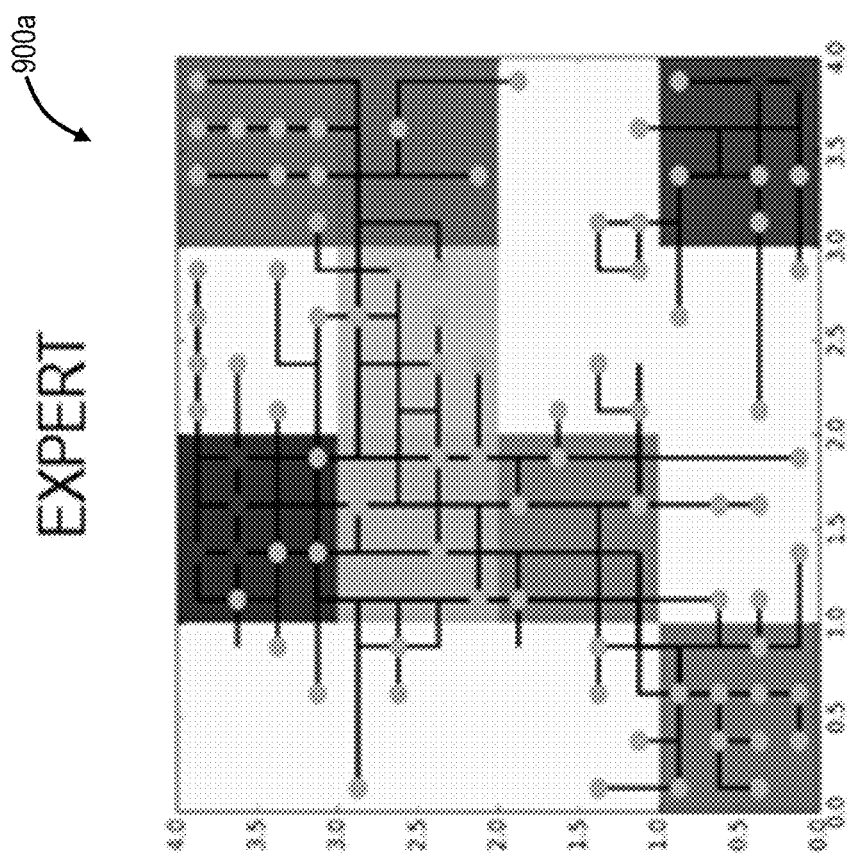

FIG. 5 illustrates a grid 500 of expert policy and FIG. 6 illustrates a grid 600 of expert trajectories. FIG. 7 illustrates a grid 700 of learner policies and FIG. 8 is a grid 800 of learner trajectories. FIG. 9 illustrate a comparison of the expert trajectories 900a and the learner trajectories 900b. The inverse RL in FIGS. 5-9 are described in Pieter Abbeel et al. "Apprenticeship Learning via Inverse Reinforcement Learning," Proceedings of the twenty-first international conference on Machine learning. ACM, 2004, the contents of which are incorporated herein by reference.

A typical RL process as the one described above is adapted to be useful when dealing with systems that are invariable or well established. For example, a pre-trained artificial intelligence (AI) may be optimized to deal with a set of rules or bounds that are unchanging as in a game such as chess. In this case, the pre-trained RL process may not need to be changed as it is optimized for the set of rules and bounds of the unchanging system or stationary environment. As stated in the present disclosure herein, continuously training the RL can allow the models to evolve along with an ecosystem that changes over time.

Enhanced Reinforcement Learning

The present disclosure provides systems and methods for enhanced reinforcement learning (RL) algorithms using future state prediction. As indicated, typical RL algorithms do not consider the future state of the system and do not anticipate evolving or growing environments, resulting in often choosing sub-optimal solutions because evolving transaction patterns are not considered in the process. In some embodiments, an offline emulator can be applied allowing the generation of samples, thus supporting continuous training of the system and fast-forward fabric saturation, the fabric being a resource based system (RBS) containing a multitude of resource types. The fabric accepts transactions which allocate resources with respect to the transactions needs and constraints and contains an RL/AI model(s) which are continuously learning based on the current reward combined with reward scaling. By modelling the fabric and transactions in an emulator, it is possible to predict future states and calculate adjusted rewards with respect to the optimal criterion. The optimal state can be defined as the state of the fabric (and the resources therein) which meets a pre-defined optimality criterion. A state generator is based on modeling past historical transactions, allowing a user to anticipate future state characteristics of the fabric. In some embodiments, online learning is based on adjusted rewards which are more representative with respect to the objective function. By maximizing fabric utilization, resource based systems can have lean operation, reducing operating expenses or expenditure (OPEX).

The Self Optimizing Fabric (SOF) high level vision is to maintain a level of optimal state, continuously adjusting to its internal and external demands, modifications, and events. The fabric being a Resource based system containing a multitude of resource types. The fabric accepts transactions which allocate resources with respect to the transactions needs and constraints, and contains an RL/AI model(s) which are continuously learning based on the current reward combined with the reward scaling. The optimal state can be variably defined based on user and operator needs. The optimal state being the state of the fabric (and the resources therein) which meets a pre-defined optimality criterion. Various embodiments will describe and give specific examples allocating compute, store, and bandwidth resources for a collection of inter-connected processes.

Figure 10:
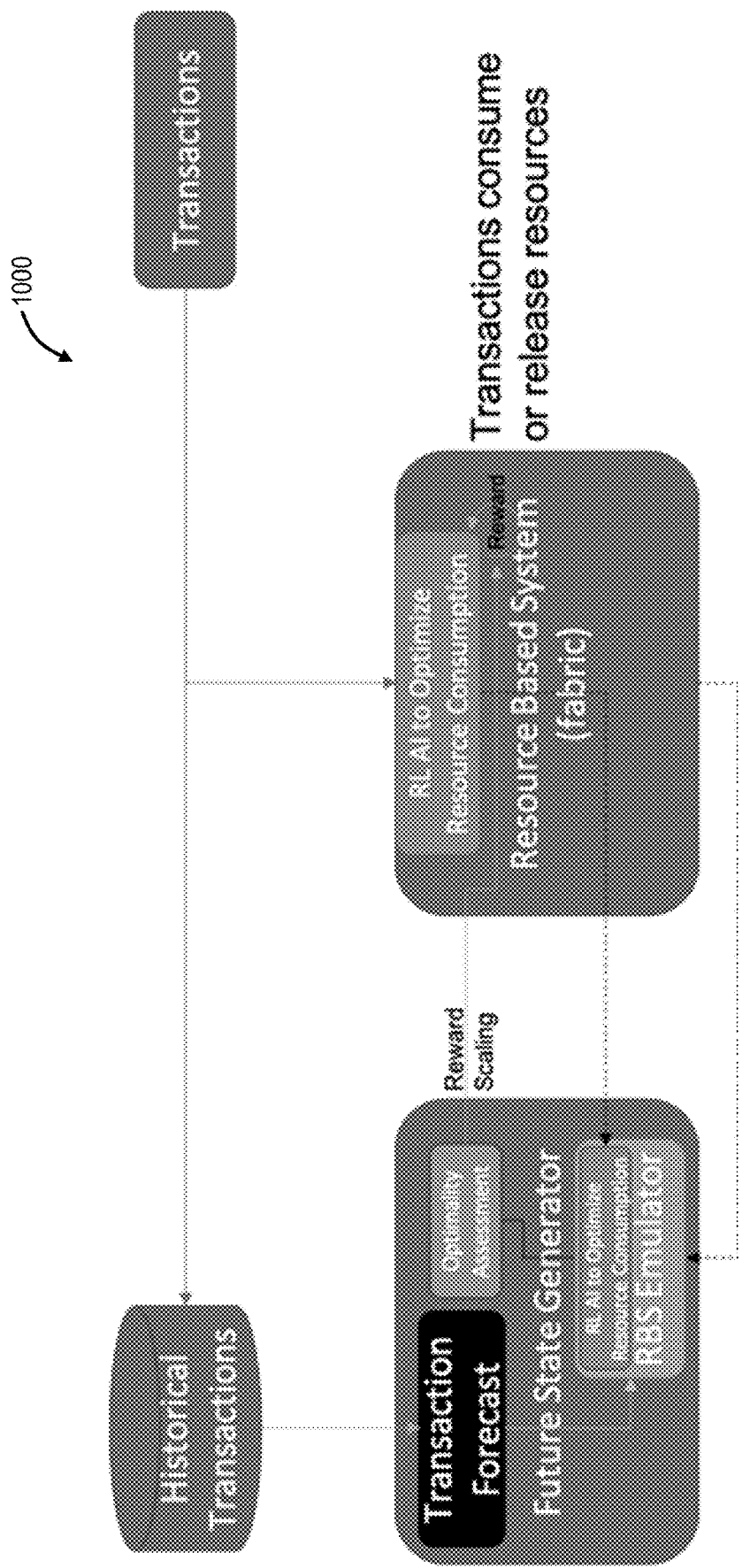
FIG. 10 is a flowchart illustrating the Optimized Resource Based System with forecasted sate/reward computation.

In any given RBS (Resource Based System), it is not possible to give an accurate instantaneous reward that would lead to an optimal future state because of the potential evolution of the environment. Some form of reward scaling and adjustment is required based on a future prediction of optimality. Reward adjustment is based on an optimality assessment of the future state of the fabric. This allows for a more accurate immediate reward to be used by the online learner, allowing it to achieve an optimal policy quicker. The present disclosure provides a mechanism/framework to enable the determination of the reward scaling factor. FIG. 10 shows a flowchart 1000 and highlights the main components and relationships required to achieve the reward scaling.

A specific use case of the present disclosure is provided and applied to EDF (ENQCOR Distributed Fabric), although the present disclosure may be adapted to be applied to any system which may benefit from the enhanced RL process described herein, for example, warehouse inventory distribution. Within the context of EDF, a focus on the problem of efficiently allocating service requests within the fabric in order to maximize utilization is present. A service request is defined as a collection of inter-connected VNFs (Virtual Network Function), each parameterized by its compute, memory, store, and inter-VNF bandwidth/latency requirements.

Figure 11:
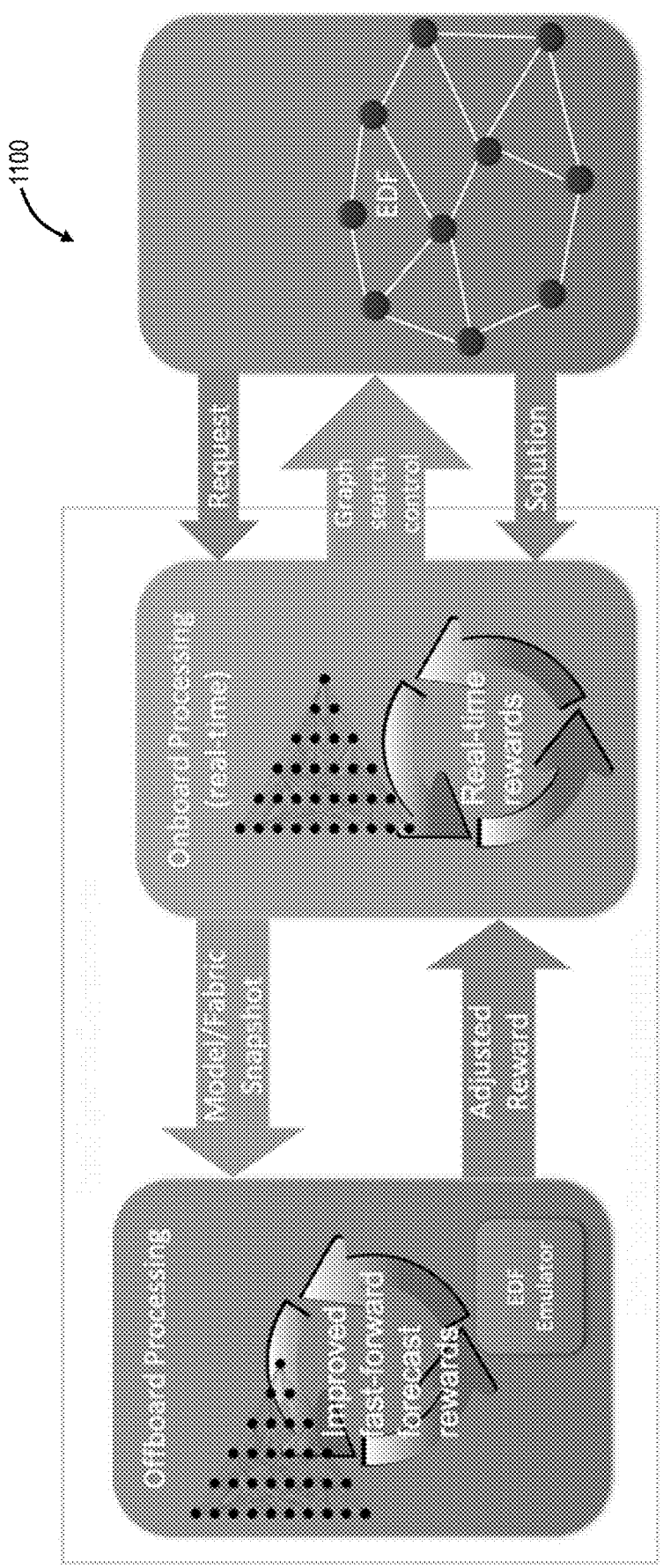
FIG. 11 is a flowchart illustrating the enhanced Reinforcement Learning application on EDF.

The AI component of this use case leverages reinforcement learning (RL). The framework of sensing and taking optimal actions is the foundation of RL which aims to maintain the "optimal state" by maximizing its long-term cumulative rewards received from the underlying environment. FIG. 1 highlights the traditional RL feedback loop 100. The present disclosure will supplement the immediate reward with a reward scaling factor used to compute the adjusted reward based on forecasted transaction. The design is shown in the flowchart 1100 in FIG. 11.

The reward function is one of the key design choices that governs and influences the RL agent's decision making and incentives. In general, it is the reward function that encodes what is desired to be optimized. This function can be fine-tuned according to operator's needs (loosely speaking, these functions are closely correlated with revenue).

The goal is thus to find the best policy, defined as the most optimal action (assignment of service request within the fabric) to take given a particular state of the underlying environment (fabric).

The present disclosure provides a method to maintain EDF in an optimal state via RL agents which are continuously learning/updating their models via a fast-forward mechanism, allowing it to predict future rewards.

The first step requires an initial RL model that has been trained offline. In order to train a model-free Deep-RL agent, an emulator is required which has a representation of the environment. The environment in this case consists of the network topology (along with its resources) and information about the service requests. Service request information can come in the form of a dataset, from which samples are fed into the offline training module. Alternatively, a generative model can be created which represents the expected flow of requests. It is important to highlight that the environment representation modelled by the service request distribution does not need to be exact like in most RL applications, since the present disclosure deals with model updates once running in production. While in production, the Q values of exploitative actions are modified with respect to the new (adjusted) rewards. Once a sufficient batch of new historical transactions has been collected, offline training can occur once again in the RBS Emulator which now has a more representative environment. The RBS Emulator being a replica snapshot of the Fabric and its latest RL model(s). It is important to note that exploration only occurs in the emulator, and not in production.

The goal is to maximize the global utility (resource utilization). If using a distributed learning approach, this can derive from maximizing the local utility of each individual agent. Thus, the reward must incentivize each agent to either fulfill a portion of the service request itself, and/or forward the remaining service request to the neighbor which will result in a successful allocation.

The reward assigned to each successfully allocated service request is a weighted sum proportional to the number of resources requested by the service (Compute, Memory, Store, Bandwidth, Latency):

$$R=\alpha_1 N_C+\alpha_2 N_M+\alpha_3 N_S+\alpha_4 N_{BW}+\alpha_5 N_L$$

Figure 12:
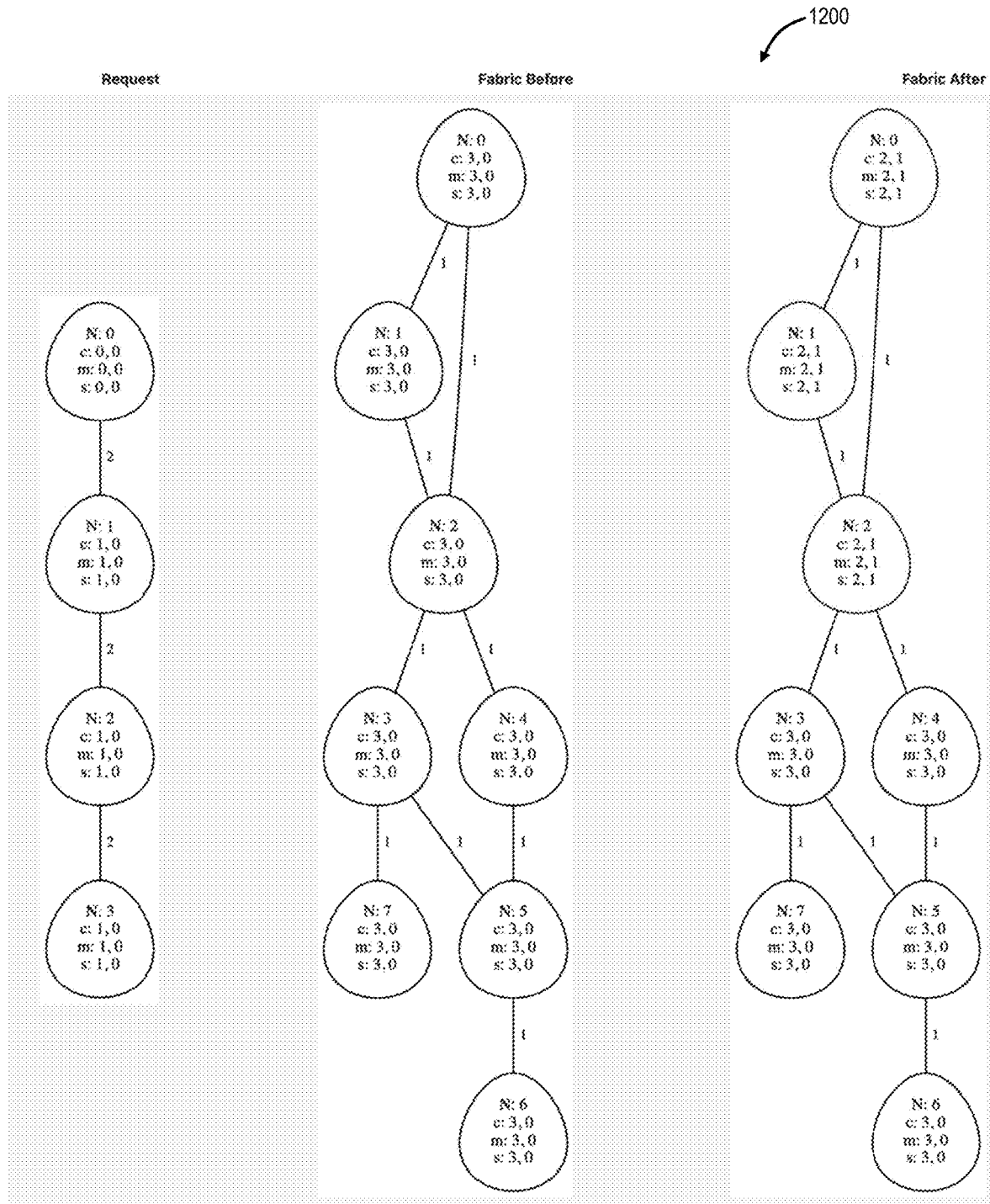
FIG. 12 is an example of service request allocation in the fabric.

For example, in FIG. 12, a graphical representation 1200 shows a service request with 3 VNFs requiring a total of 3 units of CPU, memory, and store each (first node of a request is empty as it represents the entry point jump server) is shown. The request is sent to a particular node in the fabric, with the current node deciding to either fulfill a partial request and/or send the remaining request to a neighboring node. After a successful allocation, a reward of 9 is returned for the current timestep (for simplicity this example assumes weighting of 1 for each resource).

Conversely, if the service request was rejected due to insufficient resources or poor decision making, a reward of −9 would be returned.

The weights are chosen and fixed by the reward designer. For uniform resource importance, the weights simply serve as normalization constants. Otherwise, they can be chosen to incentivise the agent to prefer certain types of requests. Intuitively, the scarcer a particular type of resource is in the network, the higher its corresponding weight will be so that the agent learns more quickly how to efficiently assign the resource in order to maximize utilization in the long run. Otherwise, sub-optimal allocations of scarce resources can lead to early bottlenecks, rendering the RBS under-utilized.

At each timestep t, we wish to maximize our cumulative rewards $G_t$ going forward (Equation 1). Considering episodic tasks as it's natural to terminate the task once n consecutive requests (n>0) have been rejected, thus saturating the fabric.

$$G_t=R_{t+1}+R_{t+2}+\ldots+R_T$$

Equation 1—Cumulative rewards starting at timestep t

Generalizing for each state, the value of a state s under a policy $\pi$ is the expected return when starting in state s and following policy $\pi$ thereafter.

$$v_\pi(s)=E_\pi[G_t|S_t=s]$$

Equation 2—Value function of state s with respect to policy $\pi$

RL aims to find a policy to maximize the value of each state which is the expected cumulative sum of rewards received per episode.

$$v_*(s) = \max_\pi v_\pi(s) \forall_s \in S \qquad \text{Equation 3}$$

Maximum state value given optimal policy

As RL maximizes the cumulative rewards (prolonging the episode task), the agents will learn to efficiently assign resources in such a way to maximize the number of requests which can be serviced by your RBS. Thus, the agents will learn effective long-term planning and anticipate future requests as learned by its environment.

Figure 13:
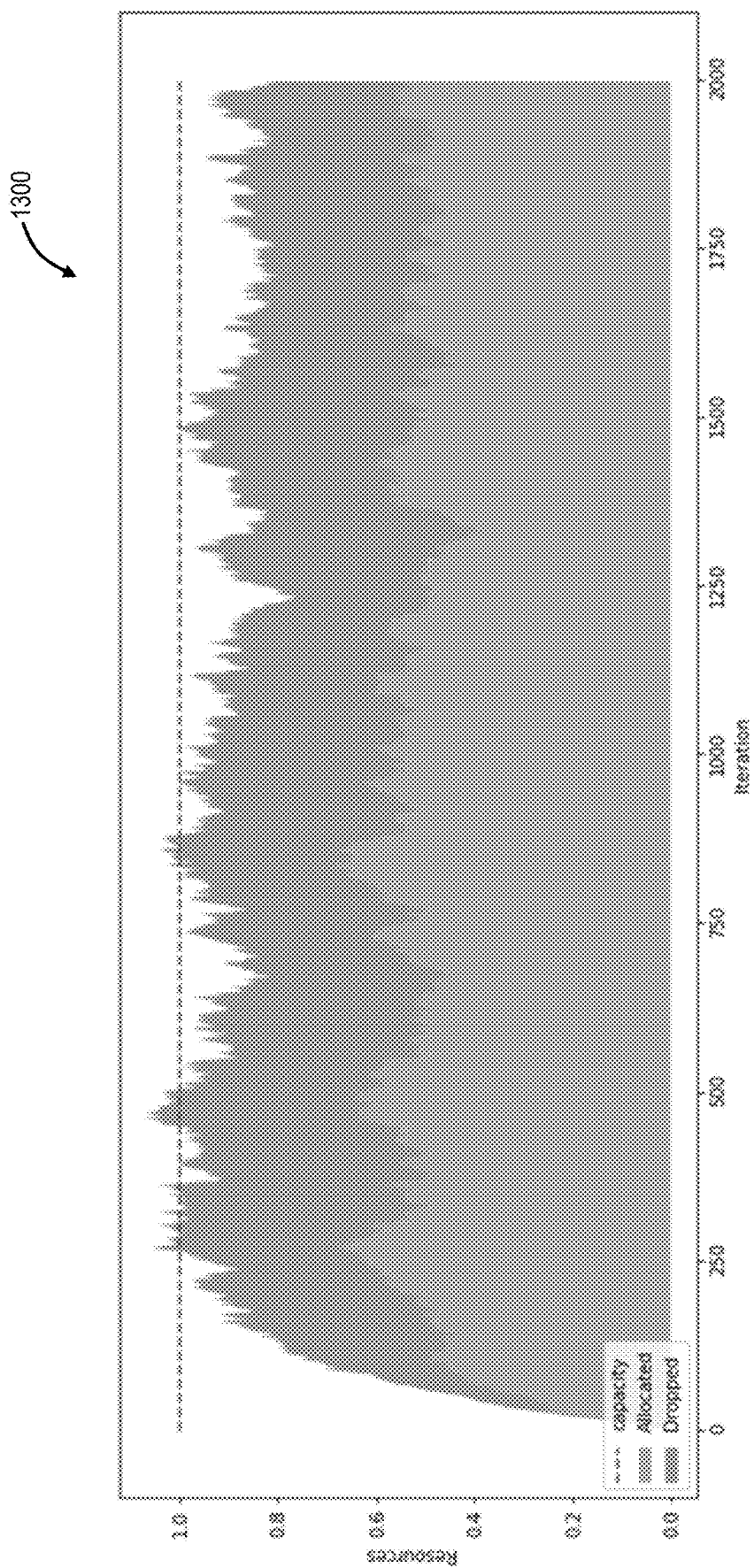
FIG. 13 illustrates an untrained policy showing allocated vs dropped requests for a random policy.

One way to measure the effectiveness of the policies is to measure the fabric utilization at the point when requests are being rejected. FIG. 13 shows a graph 1300 of an untrained policy (equivalent to random), where rejections (dropped requests) are present when only around 50% of the fabric is utilized (represented by the Allocated area). The best algorithm would minimize the pink area below the dotted line which represents total fabric capacity.

Figure 14:
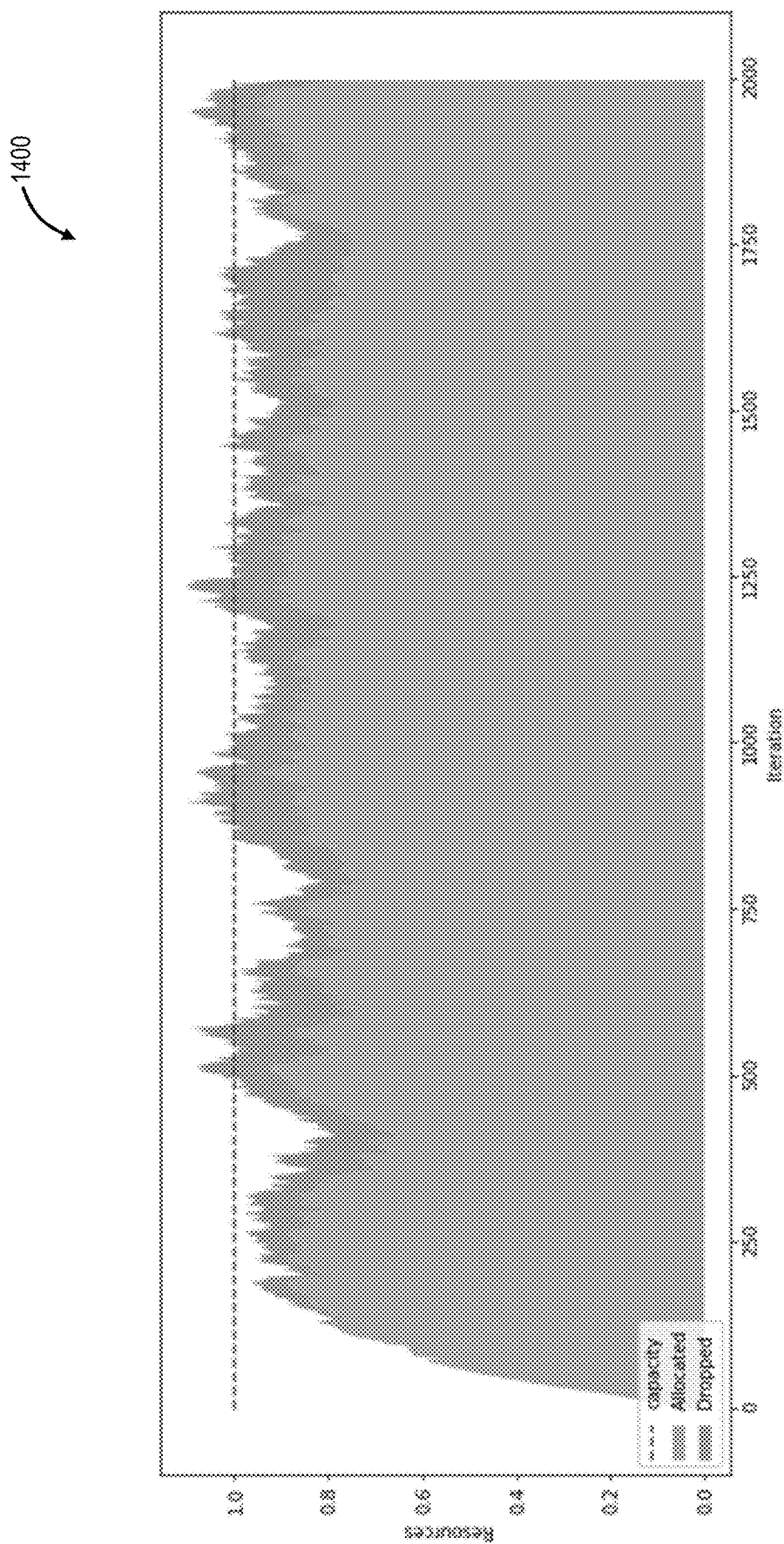
FIG. 14 illustrates an improved policy showing allocated vs dropped requests for a trained policy.

FIG. 14 shows a graph 1400 demonstrating an improved policy where now the utilization has been increased to ~80% before the fabric becomes strained and starts dropping requests, demonstrating the effectiveness of the present disclosure.

Over time, the RL agent environment can evolve with respect to the changes in service demand and resource availability. Rather than waiting to train offline at set interval times, the present disclosure proposes continuous model adjustment (online learning) via a fast-forward reward mechanism. If resource allocations are sparse in the fabric, it is not obvious whether a particular allocation may be optimal with respect to future requests. With the new adjusted reward received from the emulator, the RL agent is able to learn much quicker since it has a more accurate reward with respect to its current action.

Figure 15:
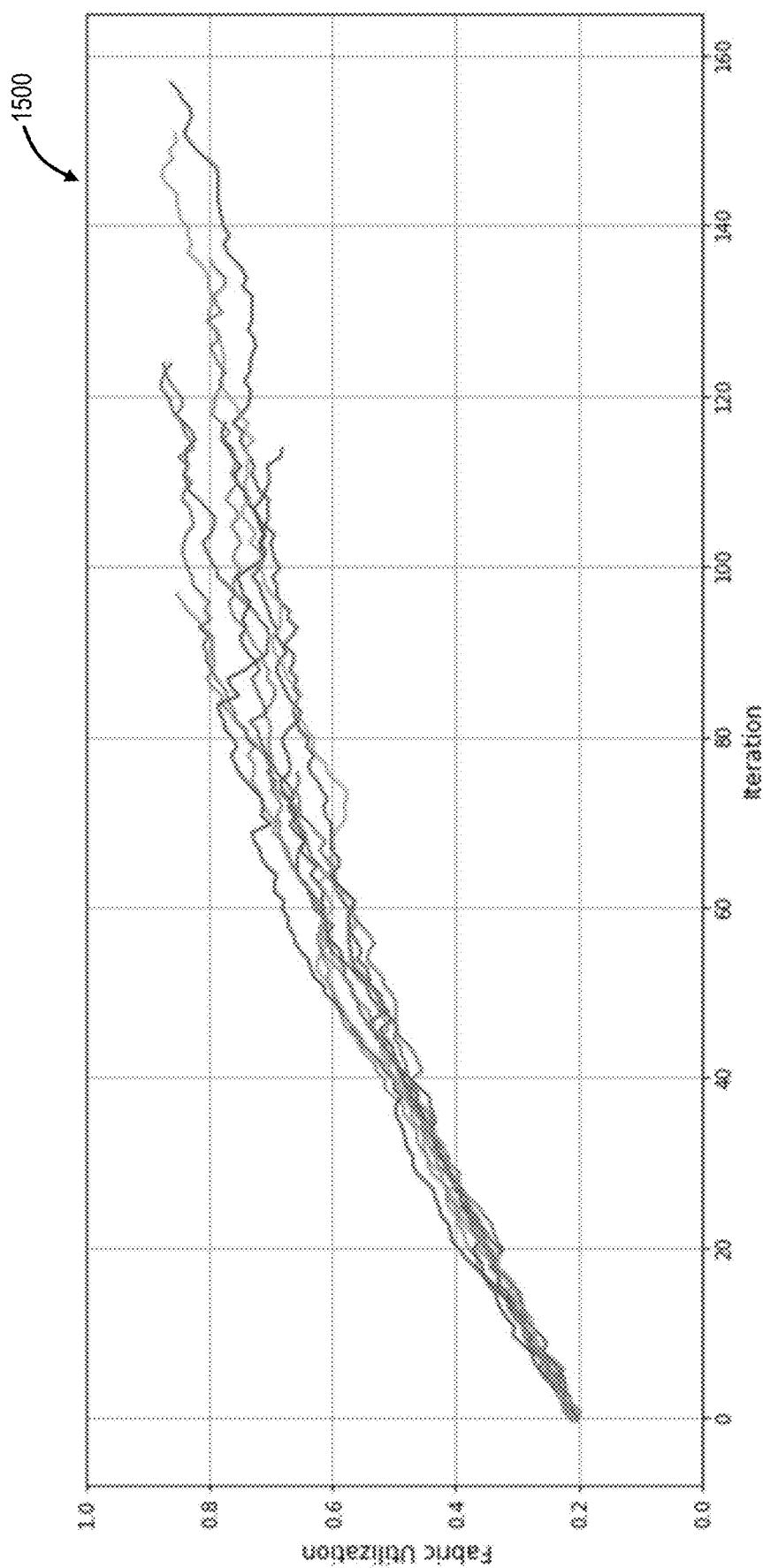
FIG. 15 illustrates a graph showing fabric utilization vs the number of simulated trajectories performed (iterations).
Figure 16:
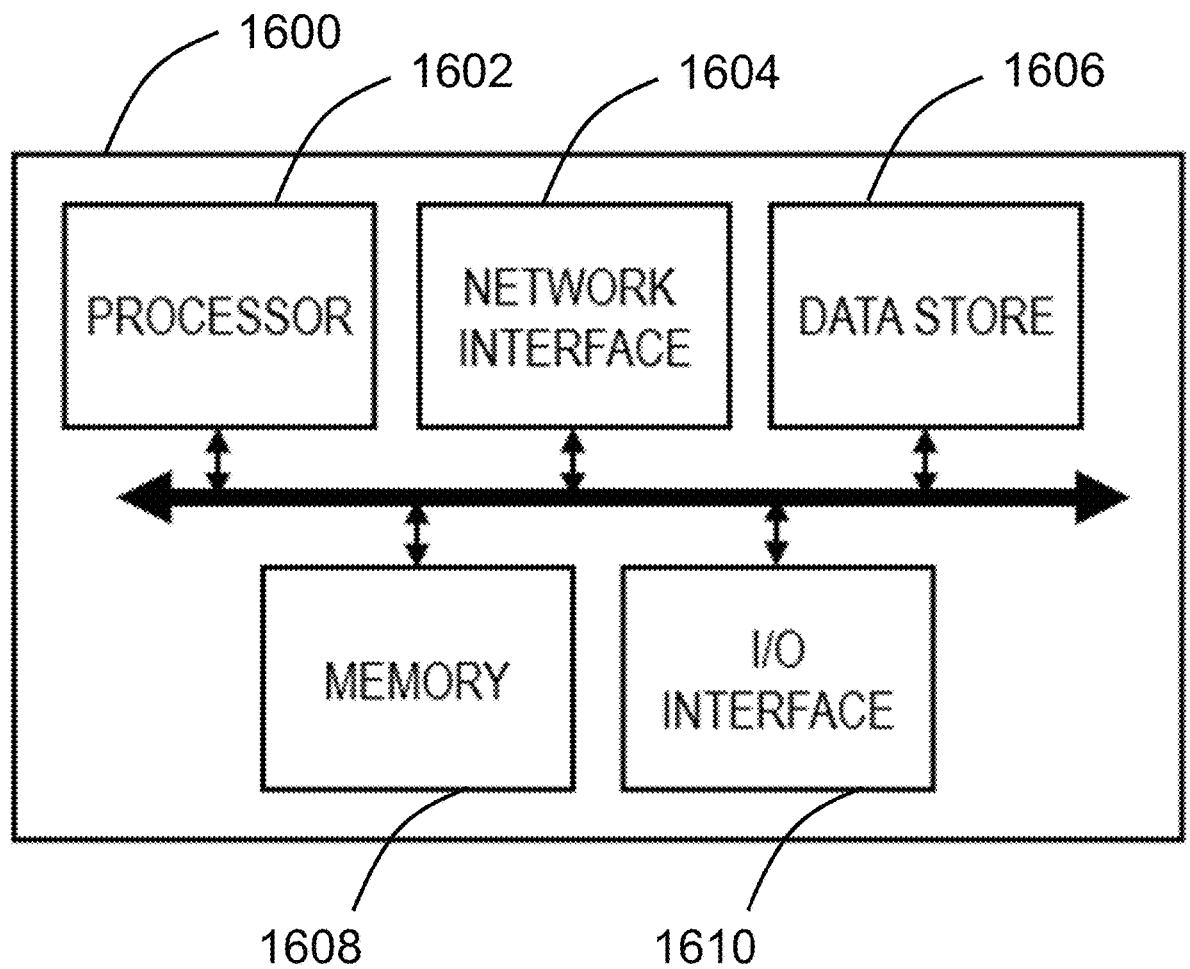
FIG. 16 is a block diagram of an example processing device.

Given a current resource allocation, the replicated fabric can be bombarded in an emulator with service requests which are acted upon by the same policy deployed and measure at which point the fabric starts to reject requests. These simulated trajectories can be performed multiple times for the same starting state to receive better statistics on the expected future utilization. An example is provided in the graph 1500 in FIG. 15. In the current state, the fabric is at 20% utilization when it received a request and performed an allocation action. Using the transaction forecast module, multiple trajectories can be initiated and observe that on average the fabric is at 77% utilization when it starts to drop requests. As the transaction forecast evolves over time, a fixed policy will underperform as it is no longer representative of the new traffic, arising the need for model adjustment.

Simulating future states returns an estimated fabric utilization between 0 and 1 which can be used to scale the reward for the current allocation. This way the system may have a better representation of the reward with respect to samples from the transaction forecaster. The state/action/reward tuples are used to update the policy/value networks in the offboard processor, updating the policy before sending back to the deployed fabric. Reward scaling provides quicker feedback into the impact decisions have on future requests.

The present disclosure excels in the fact that the emulator is fast-forwarded to a future state that can better represent the given reward for a service allocation. In ordinary circumstances, a resource based system may not be saturated for some time so that allocation decisions do not have an immediate negative effect. It is only when a surge of demand occurs (evolving environment) does efficient allocation become crucial. By simulating a surge in the emulator, it is possible to answer the question of whether or not the current allocation was optimal with respect to future states.

The application of the present disclosure is suitable for any resource based system and is not unique to the present example of networking. Another example could be inventory warehouses, where it is crucial to optimally assign goods to a particular warehouse which best serves the local customers in the long run. The present example of networking shall be construed as a non-limiting example.

Example Processing Device

The processing device 1600 can include a processor 1602 which is a hardware device for executing software instructions. The processor 1602 can be any custom made or commercially available processor, a central processing unit (CPU), an auxiliary processor among several processors associated with the processing device 1600, a semiconductor-based microprocessor (in the form of a microchip or chipset), or generally any device for executing software instructions. When the processing device 1600 is in operation, the processor 1602 is configured to execute software stored within the memory, to communicate data to and from the memory, and to generally control operations of the processing device 1600 pursuant to the software instructions. The processing device 1600 can also include a network interface 1604, a data store 1606, memory 1608, an I/O interface 1610, and the like, all of which are communicatively coupled to one another and to the processor 1602.

The network interface 1604 can be used to enable the processing device 1600 to communicate on a data communication network, such as to communicate to a management system and the like. The network interface 1604 can include, for example, an Ethernet module. The network interface 1604 can include address, control, and/or data connections to enable appropriate communications on the network. The data store 1606 can be used to store data, such as control plane information, provisioning data, Operations, Administration, Maintenance, and Provisioning (OAM&P) data, etc. The data store 1606 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 1606 can incorporate electronic, magnetic, optical, and/or other types of storage media. The memory 1608 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 1608 may incorporate electronic, magnetic, optical, and/or other types of storage media. Note that the memory 1608 can have a distributed architecture, where various components are situated remotely from one another, but may be accessed by the processor 1602. The I/O interface 1610 includes components for the processing device 1600 to communicate with other devices.

Enhanced Reinforcement Learning Process

Figure 17:
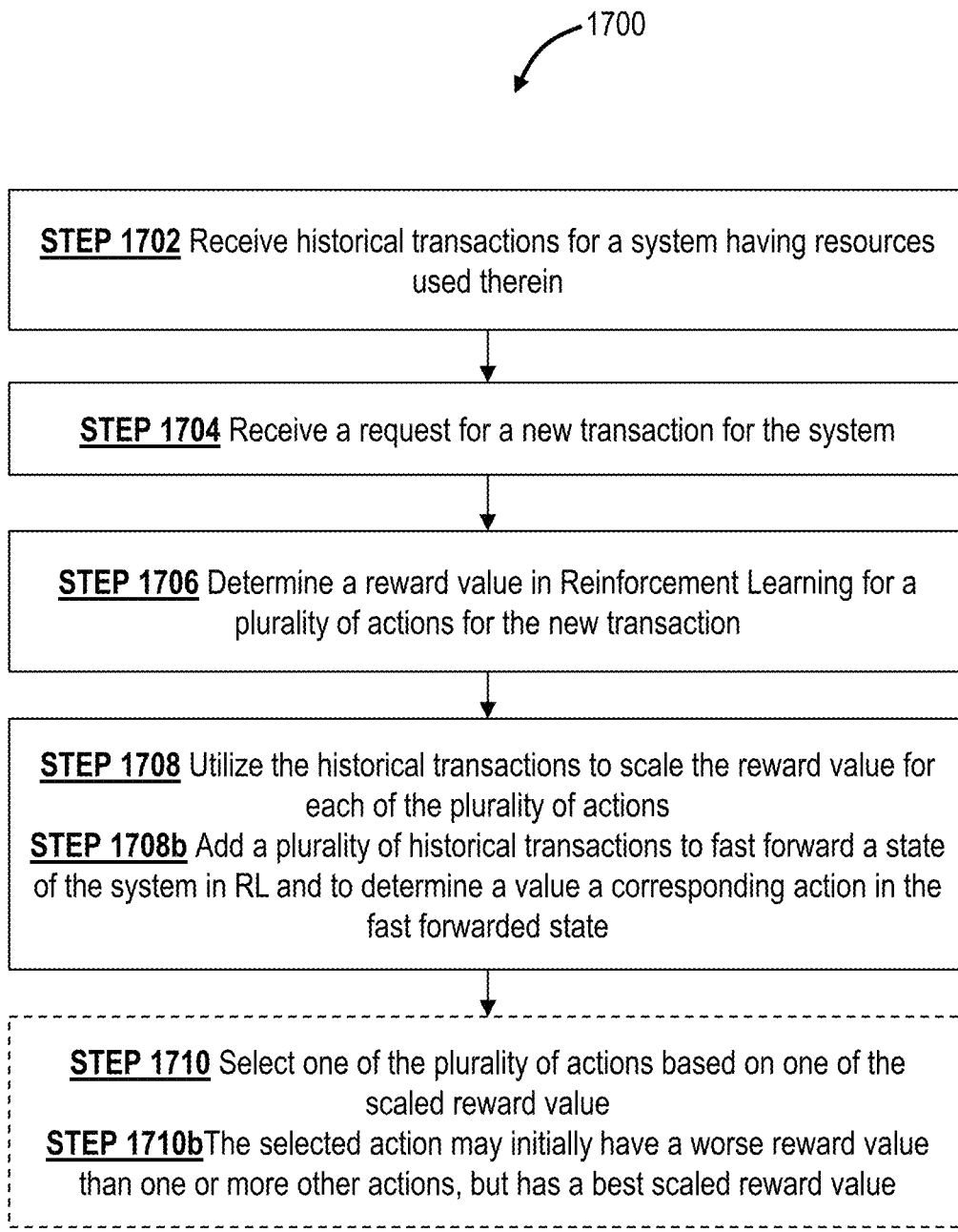
FIG. 17 is a flowchart of an enhanced Reinforcement Learning process.

FIG. 17 is a flowchart of an enhanced RL process 1700. In various embodiments, the process 1700 can be realized as a method having steps, a system including at least one processor and memory with instructions that, when executed, cause the at least one processor to implement the steps, and a non-transitory computer-readable medium having instructions stored thereon for programming at least one processor to perform the steps.

The process 1700 includes receiving historical transactions for a system having resources used therein. A request for a new transaction is then received for the system. A reward value is determined in Reinforcement Learning for a plurality of actions for the new transaction. The historical transactions are utilized to scale the reward value for each of the plurality of actions. A plurality of historical transactions may be added to fast forward a state of the system in RL and to determine a value and corresponding action in the fast forwarded state. One of the plurality of actions is selected based on one of the scaled reward values. The selected action may initially have a worse reward value than one or more other actions, but has a best scaled reward value.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause a processor to perform the steps of:
   receiving a plurality of historical transactions for a system having resources used therein;
   receiving a request for a new transaction for the system;
   determining a reward value in Reinforcement Learning (RL) for a plurality of actions for the new transaction;
   utilizing the plurality of historical transactions to fast forward a state of the system in RL and determine a scaling factor; and
   scaling the reward value for each of the plurality of actions utilizing the scaling factor;
   wherein the scaling factor is determined from an estimated fabric utilization of the fast forwarded state of the system.

2. The non-transitory computer-readable medium of claim 1, wherein the steps further include selecting one of the plurality of actions based on the scaled reward value.

3. The non-transitory computer-readable medium of claim 2, wherein the selected action initially has a worse reward value than one or more other actions of the plurality of actions, but has a best scaled reward value.

4. The non-transitory computer-readable medium of claim 1, wherein the utilizing includes adding the plurality of historical transactions to fast forward the state of the system in RL and to determine a scaled reward value and corresponding action in the fast forwarded state in an emulator.

5. The non-transitory computer-readable medium of claim 1, wherein the plurality of historical transactions all include addition of resources to the system.

6. The non-transitory computer-readable medium of claim 1, wherein the system is a network.

7. The non-transitory computer-readable medium of claim 1, wherein the instructions cause the processor to perform the steps of
   continuously training the RL based on the reward value and the scaled reward value.

8. A server comprising:
   a processing device; and
   a memory device configured to store a computer program having instructions that, when executed, cause a processing device to perform the steps of:
   receiving a plurality of historical transactions for a system having resources used therein;
   receiving a request for a new transaction for the system;
   determining a reward value in Reinforcement Learning (RL) for a plurality of actions for the new transaction;
   utilizing the plurality of historical transactions to fast forward a state of the system in RL and determine a scaling factor; and
   scaling the reward value for each of the plurality of actions utilizing the scaling factor;
   wherein the scaling factor is determined from an estimated fabric utilization of the fast forwarded state of the system.

9. The server of claim 8, wherein the steps further include selecting one of the plurality of actions based on the scaled reward value.

10. The server of claim 9, wherein the selected action initially has a worse reward value than one or more other actions of the plurality of actions, but has a best scaled reward value.

11. The server of claim 8, wherein the utilizing includes adding the plurality of historical transactions to fast forward the state of the system in RL and to determine a scaled reward value and corresponding action in the fast forwarded state in an emulator.

12. The server of claim 8, wherein the plurality of historical transactions all include addition of resources to the system.

13. The server of claim 8, wherein the system is a network.

14. A method comprising steps of:
receiving a plurality of historical transactions for a system having resources used therein;
receiving a request for a new transaction for the system;
determining a reward value in Reinforcement Learning (RL) for a plurality of actions for the new transaction;
utilizing the plurality of historical transactions to fast forward a state of the system in RL and determine a scaling factor; and
scaling the reward value for each of the plurality of actions utilizing the scaling factor;
wherein the scaling factor is determined from an estimated fabric utilization of the fast forwarded state of the system.

15. The method of claim 14, wherein the steps further include selecting one of the plurality of actions based on the scaled reward value.

16. The method of claim 15, wherein the selected action initially has a worse reward value than one or more other actions of the plurality of actions, but has a best scaled reward value.

17. The method of claim 14, wherein the utilizing includes adding the plurality of historical transactions to fast forward the state of the system in RL and to determine a scaled reward value and corresponding action in the fast forwarded state in an emulator.

18. The method of claim 14, wherein the plurality of historical transactions all include addition of resources to the system.

19. The non-transitory computer-readable medium of claim 1, wherein the fast forwarded state of the system indicates a surge of demand on the system.

* * * * *